United States Patent
Lin et al.

(10) Patent No.: US 10,076,894 B2
(45) Date of Patent: Sep. 18, 2018

(54) FILM LAMINATOR FOR CELL PHONES

(71) Applicant: Alpha Comm Enterprises Inc., Lawrenceville, GA (US)

(72) Inventors: Shaoyu Lin, Guangzhou (CN); Qiang Xiong, Guanzhou (CN)

(73) Assignee: Alpha Comm Enterprises, Inc., Lawrenceville, GA (US)

( * ) Notice: Subject to any disclaimer, the term of this patent is extended or adjusted under 35 U.S.C. 154(b) by 0 days.

(21) Appl. No.: 14/945,189

(22) Filed: Nov. 18, 2015

(65) Prior Publication Data
US 2017/0136751 A1 May 18, 2017

(51) Int. Cl.
*B32B 37/00* (2006.01)
*B32B 38/18* (2006.01)

(52) U.S. Cl.
CPC ........ *B32B 37/0046* (2013.01); *B32B 37/003* (2013.01); *B32B 38/1841* (2013.01); *B32B 2307/412* (2013.01); *B32B 2457/208* (2013.01)

(58) Field of Classification Search
USPC ........ 156/247, 249, 289, 297, 701, 291, 750
See application file for complete search history.

(56) References Cited

U.S. PATENT DOCUMENTS

| | | | | |
|---|---|---|---|---|
| 7,435,921 B2 * | 10/2008 | Rae | ...................... | H01H 9/0242 |
| | | | | 200/333 |
| 8,369,072 B1 * | 2/2013 | Alonzo | ................. | G06F 1/1628 |
| | | | | 361/679.01 |
| 8,393,377 B2 * | 3/2013 | Patel | ................... | B29C 63/0004 |
| | | | | 156/391 |
| 8,640,759 B2 * | 2/2014 | Chen | .................. | B29C 63/0004 |
| | | | | 156/538 |
| 8,675,353 B1 * | 3/2014 | Alonzo | ................. | G06F 1/1628 |
| | | | | 361/679.01 |
| 8,944,425 B2 * | 2/2015 | Napier | ................ | B32B 37/0046 |
| | | | | 269/289 R |
| 9,033,019 B2 * | 5/2015 | Patel | ................... | B29C 63/0004 |
| | | | | 156/528 |
| 9,089,085 B2 * | 7/2015 | Patel | ................... | B29C 63/0004 |
| D738,172 S * | 9/2015 | Chen | ............................... | D8/14 |
| 9,192,086 B2 * | 11/2015 | Hsu | ........................ | H05K 13/00 |
| 9,254,629 B2 * | 2/2016 | Napier | ................ | B32B 37/0046 |
| 2010/0092713 A1 * | 4/2010 | Bullard | .................... | B41M 1/12 |
| | | | | 428/40.1 |
| 2010/0200456 A1 * | 8/2010 | Parkinson | ............. | B29C 33/485 |
| | | | | 206/701 |
| 2012/0211168 A1 * | 8/2012 | Patel | ................... | B29C 63/0004 |
| | | | | 156/391 |

(Continued)

*Primary Examiner* — Sing P Chan
(74) *Attorney, Agent, or Firm* — Hill, Kertscher & Wharton; Gregory T. Ourada

(57) ABSTRACT

Provided is a film laminator for cell phones, useful for film lamination on a surface of a cell phone, including: a cell phone fixing plate, on which a through hole for receiving the cell phone is established, and a top surface of which is a horizontal face; with at least one position limiting plate for abutting the cell phone within the through hole being also fixed on the top surface. The film laminator for cell phones further includes: a film laminating plate for fixing a cell phone film; one end of which is hinged to the cell phone fixing plate, and the other end of which is movable freely so that the film laminating plate is bonded with the top surface of the cell phone fixing plate.

10 Claims, 5 Drawing Sheets

(56) References Cited

U.S. PATENT DOCUMENTS

| | | | |
|---|---|---|---|
| 2012/0211170 A1* | 8/2012 | Patel | B29C 63/0004 156/538 |
| 2013/0020020 A1* | 1/2013 | Liu | B29C 63/02 156/247 |
| 2013/0199714 A1* | 8/2013 | Patel | B29C 63/0004 156/249 |
| 2013/0237296 A1* | 9/2013 | Chen | B29C 63/0004 455/575.8 |
| 2014/0124146 A1* | 5/2014 | Patel | B29C 63/0004 156/574 |
| 2014/0130971 A1* | 5/2014 | Wu | H05K 13/00 156/249 |
| 2014/0230988 A1* | 8/2014 | Chou | B29C 63/0004 156/60 |
| 2015/0246514 A1* | 9/2015 | LaColla | B29C 63/02 156/60 |
| 2015/0246515 A1* | 9/2015 | Patel | B29C 63/0004 156/579 |
| 2015/0277502 A1* | 10/2015 | Witham | G06F 1/1626 156/249 |
| 2015/0314523 A1* | 11/2015 | Mason | B29C 63/02 156/247 |
| 2015/0321416 A1* | 11/2015 | Patel | B29C 63/0004 156/249 |
| 2016/0009024 A1* | 1/2016 | Mason | B29C 63/02 156/249 |

\* cited by examiner

FILM LAMINATOR FOR CELL PHONES

TECHNICAL FIELD

The utility model relates to a manufacturing technology of cell-phone peripheral products, especially a film laminator for cell phones, and pertains to the field of film laminating equipments.

DESCRIPTION OF THE RELATED ART

With the development of society and the improvement of living standards, more and more people start to use portable electronic devices, such as cell phones, tablet computers, etc. For ease of reading, the screen size of portable electronic devices is gradually increased, and people become more and more aware about screen protection. In general, people will attach a layer of protective film to the screen of a portable digital device. However, with the increasing frequency of use, the increasing of friction and a scratch from outside, the protective film is very easy to be destroyed, and then re-lamination of film is required.

In prior art, a manual mode is usually employed for conducting film lamination on a digital product. That is, after three layers of laminated films are aligned with the screen of an electronic device, an outer film in the first layer is peeled off firstly; next, an end of a primary film is attached to the screen of the electronic device, and air under the primary film is squeezed out slowly so that the primary film is attached to the screen of the electronic device; finally, a protective film in the outermost layer is peeled off. As regards the manual film lamination in prior art, the following circumstances are liable to occur: laminated films are not easy to align, bubbles are produced easily, and so on. In a word, the film laminating quality of manual film lamination is difficult to be ensured.

Another mode in prior art is to conduct film lamination by use of a roller, but its roller facility has a complex manufacturing process and a high cost, and it can only be used to stick a flexible thin film.

SUMMARY OF THE UTILITY MODEL

According to embodiments of the utility model, there is provided a film laminator for cell phones that has a low cost, a good film laminating quality and is usable to stick a hard thin film. A film laminator for cell phones provided by an embodiment of the utility model, useful for film lamination on a surface of a cell phone, includes: a cell phone fixing plate, on which a through hole for receiving the cell phone is established, and a top surface of which is a horizontal face; with at least one position limiting plate for abutting the cell phone within the through hole being also fixed on the top surface;

the film laminator for cell phones further includes: a film laminating plate for fixing a cell phone film; one end of which is hinged to the cell phone fixing plate, and the other end of which is movable freely so that the film laminating plate is bonded with the top surface of the cell phone fixing plate.

As for the film laminator for cell phones stated above, wherein, two sets of positioning holes are provided on the cell phone fixing plate; and the position limiting plate is two, each of which is fixed onto the cell phone fixing plate by means of one set of positioning holes.

As for the film laminator for cell phones stated above, wherein, a groove for fixing the cell phone film is provided on the film laminating plate, and is established on a face of the film laminating plate for bonding with the cell phone fixing plate.

As for the film laminator for cell phones stated above, wherein, the cell phone film includes a first outer film, a primary film and a second outer film that are stacked sequentially, a separating strip is provided at an end of the first outer film, an end of the second outer film is jointed to the film laminating plate, and an adhering sheet is arranged between the first outer film and the primary film.

As for the film laminator for cell phones stated above, wherein, when the film laminating plate is bonded with the top surface of the cell phone fixing plate, the groove coincides with the through hole.

As for the film laminator for cell phones stated above, wherein, the shape of the through hole is the same as the shape of profile of the cell phone.

As for the film laminator for cell phones stated above, wherein, each of the position limiting plates is located at an edge of the through hole, and each of the position limiting plates covers a part of the through hole.

As for the film laminator for cell phones stated above, wherein, the film laminating plate is a transparent construct.

As for the film laminator for cell phones stated above, wherein, an exhaust through hole is established on the film laminating plate, and communicates with the bottom of the groove.

As for the film laminator for cell phones stated above, wherein, the cell phone fixing plate is a hard paper board, and its thickness is in the range of 2.5 to 7 mm; the film laminating plate is a hard paper board, and its thickness is in the range of 0.5 to 1.5 mm; the position limiting plate is a PET board, and its thickness is in the range of 0.1 to 0.5 mm.

With respect to the film laminator for cell phones according to the utility model, because the position limiting plate is provided on the cell phone fixing plate, the surface of the cell phone to which a film is to be attached can handily be kept in flush with the top surface of the cell phone fixing plate. Upon film lamination, the film laminating plate can contact with the top surface of the cell phone fixing plate and the surface of the cell phone to which a film is to be attached at the same time, so that the stress that is laid on it in the course of film lamination is very even, and bubbles are not liable to occur. Thus, a good effect of film lamination is obtained. Furthermore, as the film laminating plate is hinged to the cell phone fixing plate, and a precise corresponding relationship between the cell phone film and the cell phone to which a film is to be attached can be obtained, the accuracy of alignment of the laminated film is guaranteed.

BRIEF DESCRIPTION OF THE DRAWINGS

In order to illustrate the technical solution in the embodiments of the utility model or in prior art more clearly, the drawings necessary for description of the embodiments or existing technologies will be briefly introduced below; it is obvious that the drawings as described below are only related to some embodiments of the utility model, and based on these drawings, other drawings can also be obtained by those ordinarily skilled in the art without any inventive work.

DESCRIPTION OF THE PREFERRED EMBODIMENTS

Figure 1:
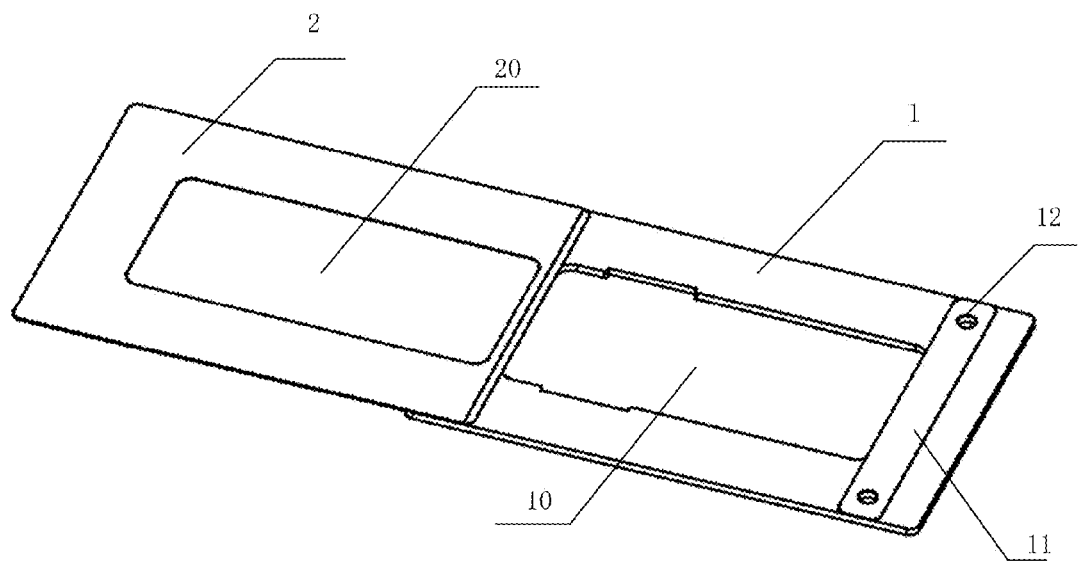
FIG. 1 is a structural view illustrating a film laminator for cell phones according to an embodiment of the utility model.

Hereinafter, technical solution in embodiments of the utility model will be described in a clearly and fully understandable way in conjunction with accompanied drawings in embodiments of the utility model. It is obvious that the described embodiments are just a part but not all of the embodiments of the utility model. Based on the embodiments in the utility model, those ordinarily skilled in the art can obtain other embodiment(s), without any inventive work, which come(s) within the scope sought for protection by the utility model.

As shown in FIGS. 1 to 5, a film laminator for cell phones is provided by the embodiment, and useful for film lamination on a surface of a cell phone. The film laminator for cell phones according to the embodiment includes: a cell-phone fixing plate 1 and a film laminating plate 2. A top surface of the cell-phone fixing plate 1 is a horizontal face, and in the cell-phone fixing plate, there is established a through hole 10 for receiving a cell phone, so that edges of the cell phone fit in with sidewalls of the through hole 10. On the top surface of the cell-phone fixing plate 1, there is further provided at least one position limiting plate 11 for abutting a cell phone within the through hole 10. The position limiting plate 11 is fixed to the top surface of the fixing plate 1, and is useful for abutting a surface of the cell phone to which a film is to be attached, so as to make sure that the surface of the cell phone to which a film is to be attached lies in the same plane as the top surface of the cell-phone fixing plate 1. In general, the position limiting plate 11 serves to abut an edge of the surface of the cell phone 3 to which a film is to be attached, and as such, not only the normal film lamination is not affected, but also the surface of the cell phone to which a film is to be attached can be assured of lying in the plane on which the top surface is located. The film laminating plate 2 is useful for fixing a cell-phone film 30, one end of the film laminating plate 2 is hinged to the cell-phone fixing plate 1, and the other end of it is movable freely so that the film laminating plate 2 is bonded with the top surface of the cell-phone fixing plate 2. The position limiting plate 11 is usually two, which are generally designed to be at both sides of the through hole 10; of course, the position limiting plate 11 may also be one. In the case that one position limiting plate is adopted, the position limiting plate 11 is usually U-shaped. This can make sure that the surface of the cell phone to which a film is to be attached fully abuts the position limiting plate 11 as well.

Figure 4:
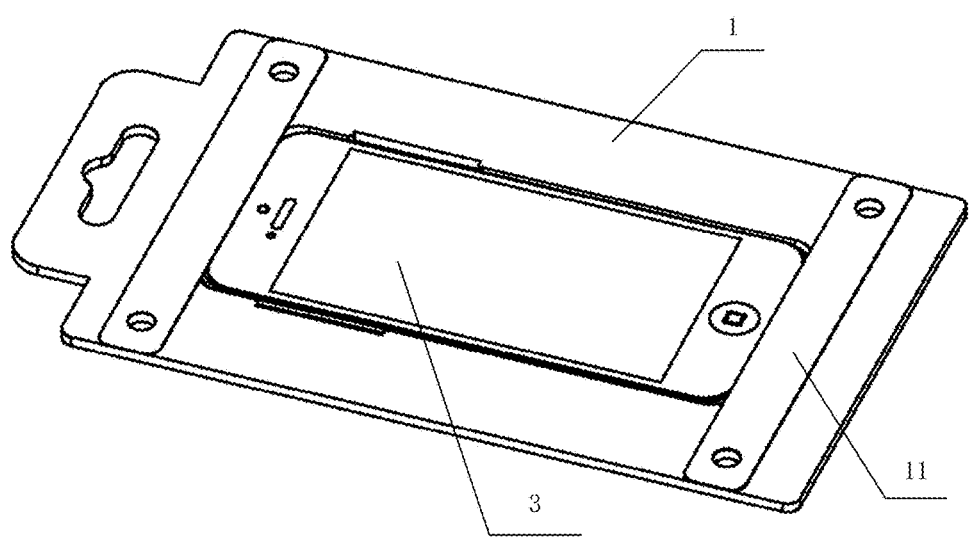
FIG. 4 is a view illustrating a service state of a cell-phone fixing plate of a film laminator for cell phones according to an embodiment of the utility model.

When embodiments of the utility model are in use, because the position limiting plate 11 is provided on the cell-phone fixing plate 1, the surface of the cell phone 3 to which a film is to be attached can handily be kept in flush with the top surface of the cell-phone fixing plate 1. Upon film lamination, the film laminating plate 2 can contact with the top surface of the cell-phone fixing plate 1 and the surface of the cell phone 3 to which a film is to be attached (as shown in FIG. 4, which is usually the screen of the cell phone 3) at the same time, so that the stress that is laid on it in the course of film lamination is very even, and bubbles are not liable to occur. Thus, a good effect of film lamination is obtained. Embodiments of the utility model are especially adaptable for sticking hard cell-phone thin films, such as glass films, thin films of toughened glass, sapphire films, or the like. As the top surface of the cell-phone fixing plate 1 lies in the same plane as the surface of the cell phone 3 to which a film is to be attached, when a hard thin film is stuck on, there is no such case where it is splintered due to uneven stress laid on it. Thus, the sticking quality is guaranteed. Furthermore, as the film laminating plate 2 is hinged to the cell-phone fixing plate 1, and a precise corresponding relationship between the cell-phone film 30 and the cell phone 3 to which a film is to be attached can be obtained, the accuracy of alignment of the laminated film is guaranteed.

On the basis of the above embodiment, a hanging hole 15 is further provided on the cell-phone fixing plate 1 in the embodiment. The hanging hole 15 is generally located at a terminal of the cell-phone fixing plate 1, and is usually in a long strip shape. A notch may also be provided on a side wall of the hanging hole 15, so that the cell-phone fixing plate 2 is kept in balance in a state of hanging.

Figure 2:
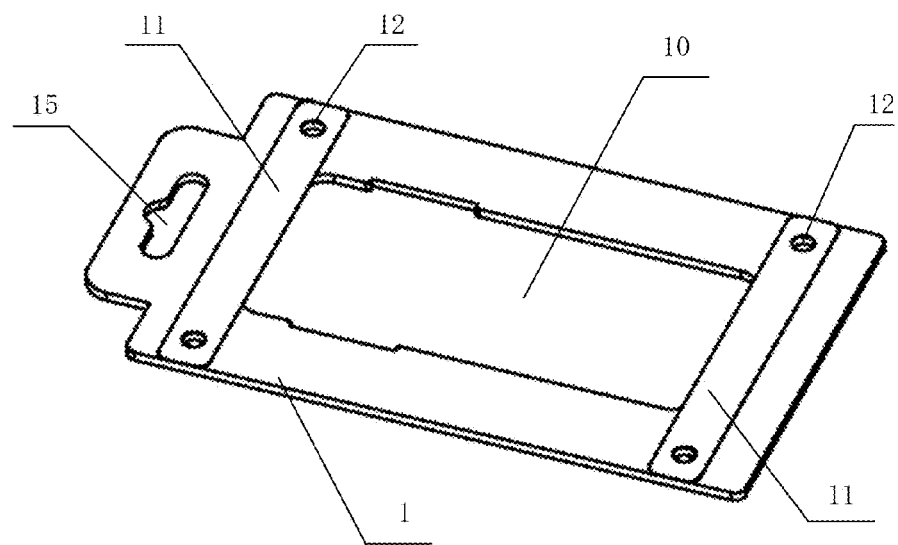
FIG. 2 is a top perspective view illustrating a cell-phone fixing plate of a film laminator for cell phones according to an embodiment of the utility model.
Figure 3:
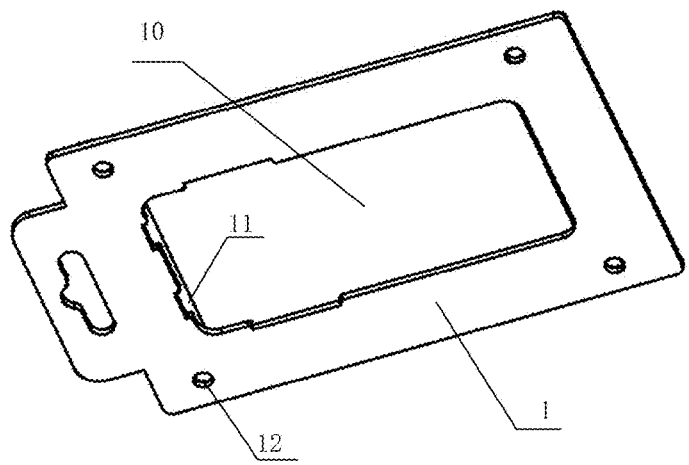
FIG. 3 is a bottom perspective view illustrating a cell-phone fixing plate of a film laminator for cell phones according to an embodiment of the utility model.

On the basis of the above embodiment, two sets of positioning holes 12 are provided on the cell-phone fixing plate 1; the position limiting plate 11 is two, each of which is fixed onto the cell-phone fixing plate 1 by means of a set of positioning holes 12. With the design of positioning holes 12, position fixing accuracy of fixing the position limiting plate 11 onto the cell-phone fixing plate 1 can be assured, and a good contact is also guaranteed when a bottom surface of the position limiting plate abuts the surface of the cell phone 3 to which a film is to be attached. As shown in FIG. 2, preferably, in the case that two position limiting plates 11 are adopted, each of the position limiting plates 11 is located at an edge of the through hole 10, and each of the position limiting plates 11 covers a part of the through hole 10. As can be seen from FIG. 3, each of the position limiting plate 11 goes beyond an edge of the through hole 10 approximately by 1 to 3 mm, so that an edge of the cell phone 3 abuts well against the position limiting plate 11 and the region for film lamination is not affected.

On the basis of the above embodiment, further, a groove 20 for fixing the cell-phone film 30 is provided on the film laminating plate 2, and is established on a face of the film laminating plate 2 for bonding with the cell-phone fixing plate 1. In general, when the film laminating plate 2 is bonded with the top surface of the cell-phone fixing plate 1, the groove 20 coincides with the through hole 10. Especially when the cell-phone film is stuck on the cell phone screen, the groove 20 and the through hole 10 are substantially equal in area. Of course, when the film is attached to the cell phone screen, the shape of the through hole 10 is the same as the shape of profile of the cell phone 3, so that the cell phone 3 is firmly clamped within the through hole 10 on the cell-phone fixing plate 1.

On the basis of the above embodiment, further, the cell-phone film 30 includes a first outer film, a primary film and a second outer film that are stacked sequentially. A separating strip (not shown in the figure) is provided at an end of the first outer film, an end of the second outer film is jointed to the film laminating plate, and an adhering sheet is arranged between the first outer film and the primary film.

Figure 5:
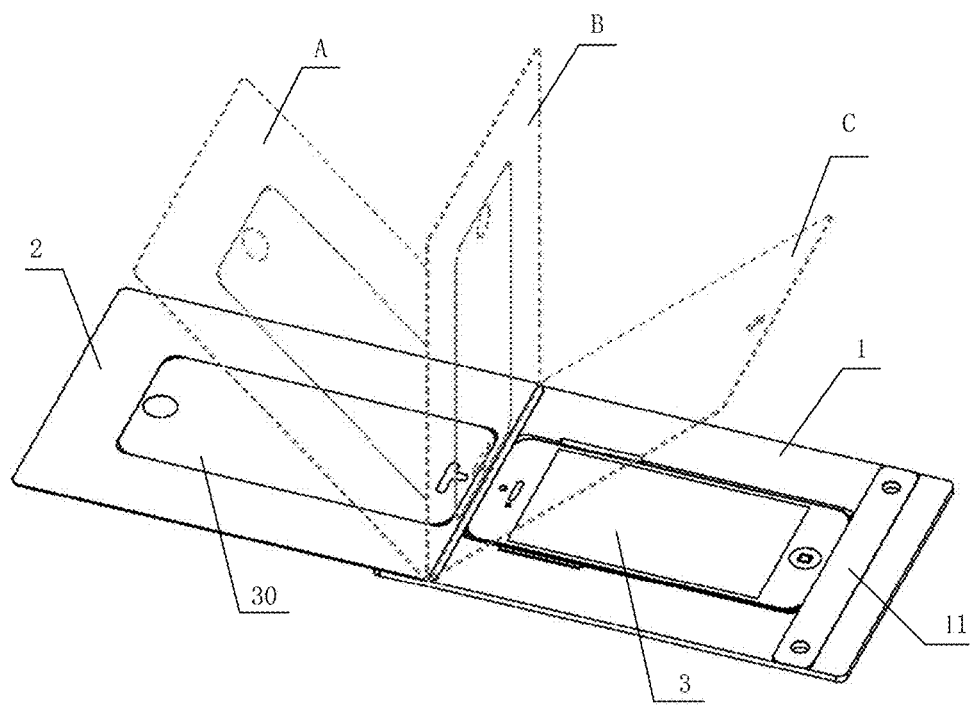
FIG. 5 is a schematic view illustrating a film laminating process of a film laminator for cell phones according to an embodiment of the utility model.

As shown in FIG. 5, after the cell-phone film 30 is fixed onto the film laminating plate 2, the first outer film is torn off by the aid of the separating strip, and the film laminating plate 2 is bonded with the top surface of the cell-phone fixing plate 1 after it has passed through three positions of A, B and C in sequence, so that the primary film is stuck on a surface of the cell phone 3 to which a film is to be attached with the adhering sheet. Subsequent to the firm sticking, open the film laminating plate 2. As the second outer film is fixed onto the film laminating plate 2, the second outer film is automatically separated from the primary film. Thus, the entire process of film lamination is completed.

On the basis of the above embodiment, further, the position limiting plate 11 is generally made of a hard plastic plate, preferably a PET board, and its thickness is in the range of 0.1 to 0.5 mm. The film laminating plate 2 is usually also made of a hard material, and for the sake of reducing the cost, is preferably a hard paper board, and its thickness is in the range of 0.5 to 1.5 mm. The cell-phone fixing plate 1 is a hard paper board, and its thickness is in the range of 2.5 to 7 mm. A hard paper board is usually made of multiple levels of hard paperboard by pressing, so as to ensure a sufficient strength. Certainly, the used hard materials are each a thin plate or a sheet possessing a certain hardness, such as a plastic board, a cardboard sandwich plate, or the like.

Figure 6:
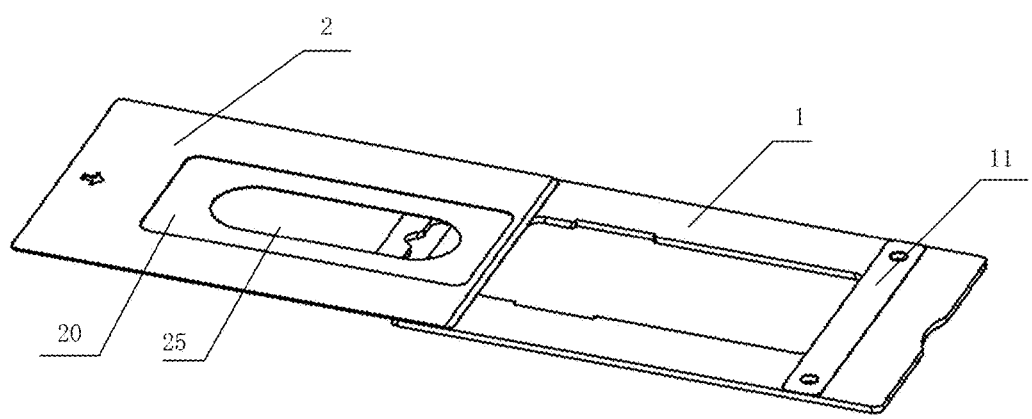
FIG. 6 is a structurally schematic view illustrating a film laminator for cell phones according to another embodiment of the utility model.
Figure 7:
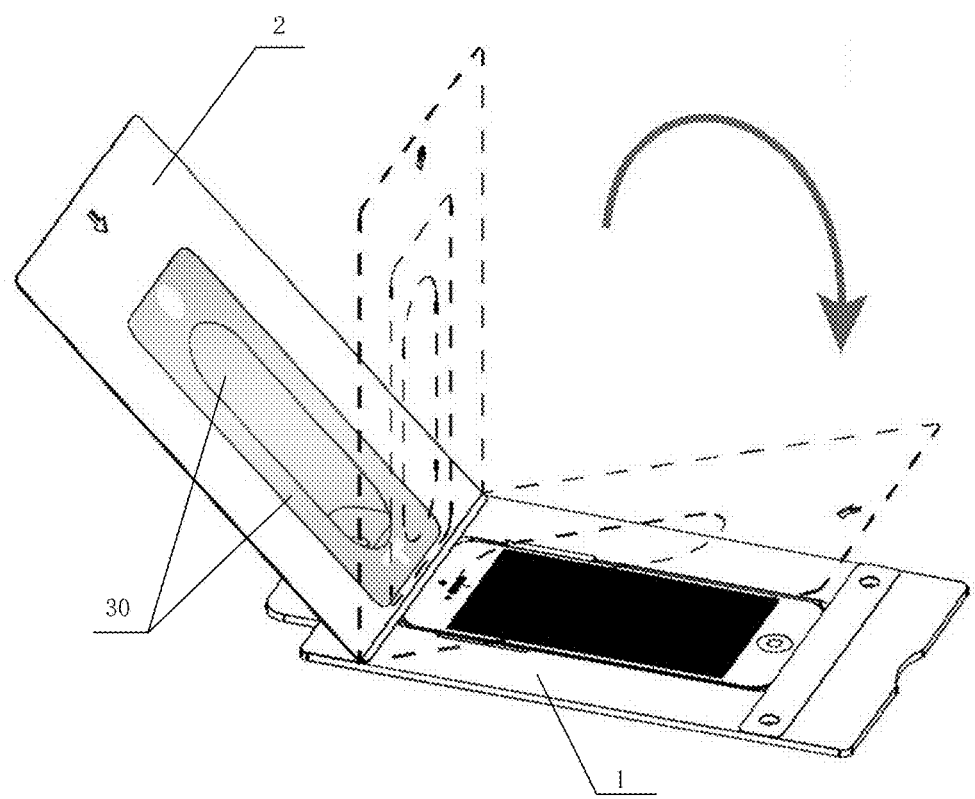
FIG. 7 is a schematic view illustrating a film laminating process of a film laminator for cell phones according to another embodiment of the utility model.
Figure 8:
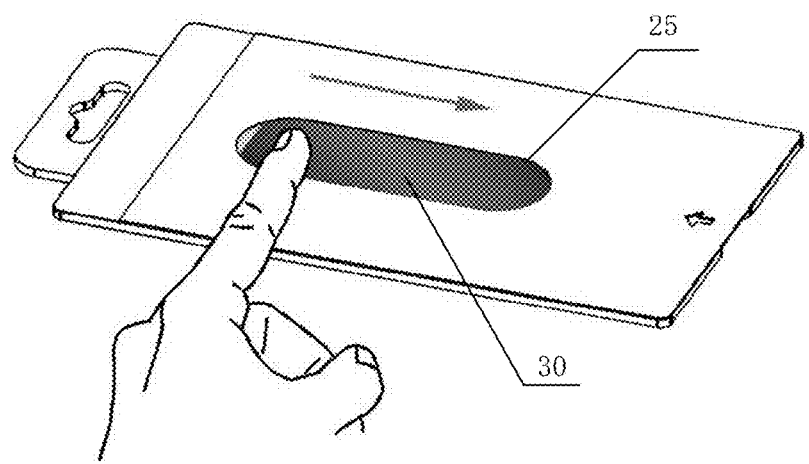
FIG. 8 is a schematic view illustrating pressing of a cell-phone film of a film laminator for cell phones according to another embodiment of the utility model.

As shown in FIG. 6, FIG. 7 and FIG. 8, in another embodiment of the utility model, a film laminating plate 2 is usually a transparent construct. That is, in a practical application process, a transparent plastic substance or other transparent material with a certain hardness is used for the film laminating plate 2. Because the film laminating plate 2 is a transparent construct, in the entire process of film lamination, an operator can visually inspect whether or not dust or air bubbles is/are present between a primary film and the surface of a cell phone to which a film is to be attached. Therefore, the success rate of film lamination and the quality of film lamination are improved greatly.

On the basis of the above embodiment, further, an exhaust through hole 25 is established on the film laminating plate 2, and communicates with the bottom of a groove 20. The exhaust through hole 25 is generally designed to be in the center of the groove 20, and is usually in the shape of an oval or a long strip, and its size is usually subject to receptibility of a thumb. The function of the exhaust through hole 25 is not merely limited to such a function that the residual air between a cell-phone film 30 and the film laminating plate 2 can be discharged by it, but also it can facilitate the operation. As shown in FIG. 8, after a primary film of the cell-phone film 30 is aligned with the surface of a cell phone to which a film is to be attached, an operator presses a central zone of the cell-phone film 30 via the exhaust through hole 25 so that the central zone of the cell-phone film 30 is bonded firstly. Thus, bubbles are prevented from generating in the central zone, and the operational quality is improved. It is to be noted that, when an opaque substance is used for the film laminating plate 2, the opaque substance takes priority for establishment of the exhaust through hole 25 on it over others. As such, not only the cost can be saved, but also the quality of laminated film is improved greatly.

It is to be noted that, the technical solution of the embodiment is not limited to the field of cell phones, rather, digital products such as tablet computers, digital cameras, digital music players and the like each can adopt the solution of the utility model for film lamination. Of course, the utility model is especially adapted for the sticking of a hard cell-phone film, such as, a glass film, a thin film of toughened glass, a sapphire film, or the like.

With reference to the specific embodiments stated above, the objectives, technical solutions and beneficial effects of the utility model have been further explained in detail. It should be understood that, descriptions made above are merely specific embodiments of the utility model, but are not used to limit the protective scope of the utility model. All modifications, equivalent replacements, improvements or the like, made within the spirit and principle of the utility model, shall be embraced in the protective scope of the utility model.

What is claimed is:

1. A film laminator for film lamination on a surface of a cell phone comprising:
   a cell phone fixing plate, with a through hole to receive said cell phone, a horizontal face with a top surface, and at least one position limiting plate fixed on said top surface for abutting an end portion of said cell phone;
   a film laminating plate with a first end and a second end;
   wherein a hinge is bonded to said first end of said film laminating plate and to said top surface of said cell phone fixing plate allowing a cell phone protective film to be affixed to said cell phone.

2. The film laminator of claim 1, wherein said cell phone fixing plate has two position limiting plates, each of which is fixed to said cell phone fixing plate utilizing a corresponding set of positioning holes located in said cell phone fixing plate.

3. The film laminator of claim 2, wherein each of said position limiting plates is located at an edge of said through hole, and wherein each of said position limiting plates covers a part of said through hole.

4. The film laminator of claim 1, wherein a groove for fixing the cell phone protective film is provided on the film laminating plate, and is established on a face of the film laminating plate for bonding with the cell phone fixing plate.

5. The film laminator of claim 4, wherein when said film laminating plate is bonded with the top surface of the cell phone fixing plate, the groove coincides with said through hole.

6. The film laminator of claim 4, wherein an exhaust through hole is established on said film laminating plate, and communicates with the bottom of said groove.

7. The film laminator of claim 1, wherein said cell phone protective film comprises a first outer film, a primary film and a second outer film that are stacked sequentially, a separating strip is provided at an end of the first outer film, an end of the second outer film is jointed to the film laminating plate, and an adhering sheet is disposed between the first outer film and the primary film.

8. The film laminator of claim 1, wherein the shape of said through hole is the same as the shape of profile of the cell phone.

9. The film laminator of claim 1, wherein said film laminating plate is comprised of transparent material.

10. The film laminator of claim 1, wherein said cell phone fixing plate comprises hard paper board, with thickness in the range of 2.5 to 7 mm; said film laminating plate comprises hard paper board, with thickness in the range of 0.5 to 1.5 mm; said position limiting plate comprises PET board, with thickness in the range of 0.1 to 0.5 mm.

\* \* \* \* \*